United States Patent [19]

Hart

[11] 4,359,672

[45] Nov. 16, 1982

[54] MOTOR STARTER WITH OPTICALLY COUPLED PUSHBUTTON STATION

[75] Inventor: John S. Hart, Racine, Wis.

[73] Assignee: Allen-Bradley Company, Milwaukee, Wis.

[21] Appl. No.: 282,006

[22] Filed: Jul. 10, 1981

[51] Int. Cl.[3] .............................................. H04Q 7/02

[52] U.S. Cl. ...................................... 318/16; 318/480; 250/214 SW

[58] Field of Search .................... 200/61.02, DIG. 36; 250/214 SW, 221, 227, 551, 578; 318/16, 480; 350/96.15, 96.16

[56] References Cited

U.S. PATENT DOCUMENTS

| | | | |
|---|---|---|---|
| 3,511,999 | 5/1970 | Pelenc | 250/214 SW |
| 3,999,074 | 12/1976 | Callaghan | 250/551 |
| 4,058,735 | 11/1977 | Tippner | 250/551 |
| 4,089,584 | 5/1978 | Polczynski | 350/96.15 |
| 4,117,460 | 9/1978 | Walworth et al. | 250/578 X |

*Primary Examiner*—Ulysses Weldon
*Attorney, Agent, or Firm*—Quarles & Brady

[57] ABSTRACT

A motor starter includes a line contactor having a coil connected to a control circuit. The control circuit includes one or more remote pushbutton stations which are connected in a control loop by fiber optic tubes. Operation of the motor can be controlled separately from each pushbutton station.

3 Claims, 1 Drawing Figure

MOTOR STARTER WITH OPTICALLY COUPLED PUSHBUTTON STATION

BACKGROUND OF THE INVENTION

The field of the invention is motor controls for use in industrial applications, and in particular, motor controls which are operated from one or more remotely located pushbutton stations.

Industrial motor controls typically include a line contactor which is energized by a control circuit to close a set of contacts which apply power to the motor. The control circuit may be complex or relatively simple, but in almost all instances it includes a start switch which is connected to deliver power to the line contactor and a stop switch which interrupts that power. These switches are usually in the form of pushbutton switches in industrial applications.

In some industrial applications the start and stop pushbuttons may be located at stations which are located remotely from the motor and its control circuit. For example, the pushbutton station may be part of a centrally located control panel. In addition, more than one pushbutton station may be required where the motor is to be operated from more than one site.

In some industrial applications it is desirable to electrically isolate equipment. In chemical plants and refineries, for example, numerous motor controls are employed along with other electrical equipment to form a control system. If lightning were to strike part of this control system, it is desirable to limit the extent of the damage as much as possible. This may be accomplished by connecting the elements of the control system together using fiber optics rather than electrically conductive wire.

SUMMARY OF THE INVENTION

The present invention relates to a motor control in which the pushbutton station for operating the motor is located remotely and coupled to the line contactor through a pair of fiber optic tubes. More specifically, a control loop is formed which includes a first optical receiver, the line contactor, a switch operated by that line contactor, a first optical transmitter, one fiber optic tube leading to the pushbutton station, a second optical receiver at the pushbutton station, a second optical transmitter at the pushbutton station, and a second fiber optic tube connecting the second optical transmitter to the first optical receiver. This control loop is energized by a start switch at the pushbutton station which connects to supply power to the second optical transmitter and the control loop is locked in this state by operation of the switch controlled by the line contactor. The control loop is de-energized by a stop switch at the pushbutton station which interrupts power to the second optical transmitter, causing the line contactor to be de-energized.

A general object of the invention is to provide an electrically isolated pushbutton station for a motor control. The only coupling between the line contactor and its associated circuitry and the pushbutton station is a pair of fiber optic tubes which are made of an insulating material. The pushbutton station has a separate power supply and full control of the motor operation is achieved.

Another object of the invention is to minimize the number of fiber optic tubes required to connect the pushbutton station and to enable the pushbutton station to be located a great distance from the line contactor and its associated circuitry. This is accomplished in part by separate optical transmitters and receivers at the ends of each fiber optic tube.

Another object of the invention is to allow other pushbutton stations to be easily added to the motor control system. This is accomplished by inserting an identical pushbutton station into the control loop using fiber optic tubes.

Yet another object of the invention is to provide visual indication at each remote pushbutton station of the state of the motor control. This is provided by separate indicator lights at each station which are energized or de-energized according to the state of the control loop.

The foregoing and other objects and advantages of the invention will appear from the following description. In the description, reference is made to the accompanying drawings which form a part thereof, and in which there is shown by way of illustration a preferred embodiment of the invention. Such embodiment does not necessarily represent the full scope of the invention, however, and reference is made thereof to the claims herein for interpreting the scope of the invention.

DESCRIPTION OF THE PREFERRED EMBODIMENT

Figure 1:
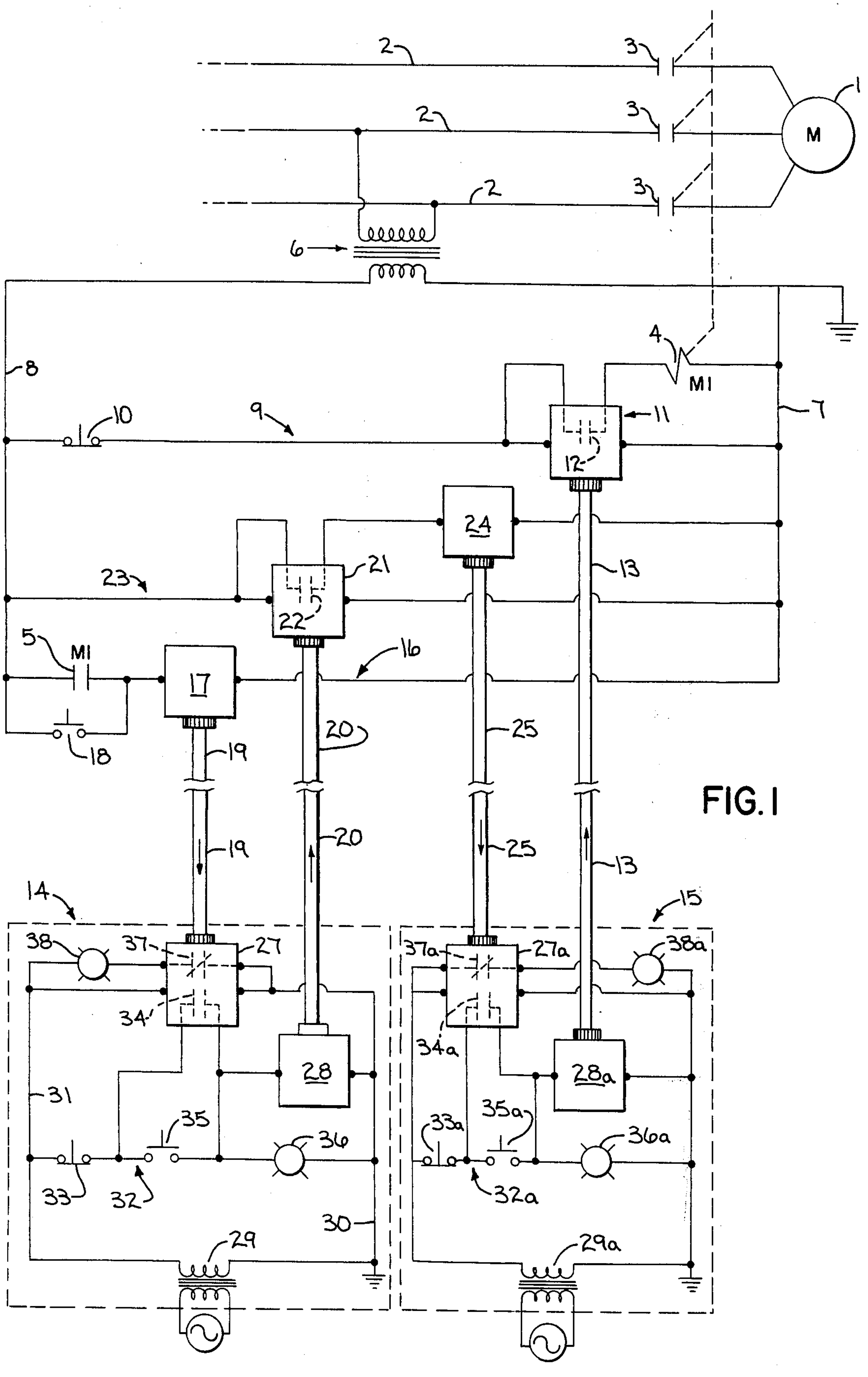
FIG. 1 is an electrical schematic diagram of a motor control circuit which incorporates the present invention.

A motor 1 is connected to power lines 2 by a set of main contacts 3 which form part of a line contactor M1 such as that disclosed in U.S. Pat. No. 3,949,333. The line contactor M1 includes a coil 4 which, when energized, closes the main contacts 3 to supply power to the motor 1. The line contactor M1 also closes a set of auxiliary contacts 5.

Power for the line contactor coil 4 is supplied by a transformer 6 which connects to the power lines 2. One side of the transformer secondary winding connects to a ground bus 7 and the other end connects to an a.c. bus 8. The line contactor coil 4 is connected across the buses 7 and 8 in a series branch 9 which includes a stop pushbutton switch 10 and a fiber optic receiver 11. The fiber optic receiver 11 is a commercially available unit such as the model 3713R described in "High Sensitivity-Medium Speed Fiber Optic Transmitter and Receiver" published in 1979 by Burr-Brown Research Corporation and it drives a solid state switch 12 which is closed when light is received through a fiber optic tube 13. When the switch 12 is thus closed, the line contactor M1 is energized to apply power to the motor 1.

The line contactor M1 and the fiber optic receiver 11 form part of a control loop which also includes a pair of optically coupled pushbutton stations 14 and 15. The contactor auxiliary switch 5 is connected in this loop and it forms part of a series branch 16 that contains a fiber optic transmitter 17 and a start pushbutton switch 18. The fiber optic transmitter 17 is the model 3713T described in the above-cited publication. When either the auxiliary contacts 5 or the start switch 18 are closed, the optical transmitter 17 is energized and it generates light through a fiber optic tube 19 to the pushbutton station 14. The pushbutton station 14 is also in the control loop and it returns a light signal through a fiber optic tube 20 to an optical receiver 21. The optical receiver 21 is identical to the optical receiver 11 and its solid state switch contacts 22 are connected in a series branch 23 with an optical transmitter 24. Thus, when the optical receiver 21 receives light through the fiber optic tube 20, its contacts 22 are closed and power is applied to the optical transmitter 24.

The optical transmitter 24 generates light through a fiber optic tube 25 to the second pushbutton station 15. The pushbutton station 15 is in the control loop and it returns light through the fiber optic tube 13. The fiber optic tube 13 drives the optical receiver 11 and it thereby closes the control loop at the contactor coil 4.

The pushbutton stations 14 and 15 are substantially identical in construction, but are located physically at different sites. Two pushbutton stations 14 and 15 are shown in the preferred embodiment, but it should be apparent that the control loop can contain one or more separate pushbutton stations. In stations, each remote pushbutton station 14 and 15 is shown connected to the motor control circuit through two fiber optic tubes, thus extending the control loop separately to each remote station. However, where it is convenient to connect the pushbutton stations together, a direct fiber optic tube connection can be made between them, thus eliminating an optical transmitter 24 and receiver 21 from the control loop.

The pushbutton station 14 includes an optical receiver 27 which connects to the fiber optic tube 19 and an optical transmitter 28 which connects to the fiber optic tube 20. Power is supplied to the pushbutton station 14 through a transformer 29 which connects to a ground bus 30 and an a.c. bus 31. A series branch 32 which includes a stop pushbutton switch 33 and a solid state switch 34 associated with the optical receiver 27 supplies electric power to the optical transmitter 28. A start pushbutton switch 35 is connected in shunt with the optical receiver switch 34, and when either switch 34 or 35 is closed, the control loop is energized by providing power to the optical transmitter 28. An indicator light 36 is connected in shunt with the optical transmitter 28 to provide the operator with a visual indication that the motor 1 is operating. A second, normally closed solid state switch 37 is associated with the optical receiver 27 and it connects in series with a second indicator light 38. When the control loop is de-energized, the switch 37 is closed and the light 38 is energized to provide a visual indication that the motor is stopped.

The second pushbutton station 15 is identical to the first and like elements have been identified with the same reference numbers followed by the suffix "a". The optical receiver 27*a* connects to the fiber optic tube 25 and a light signal is returned to the motor control circuit by the optical transmitter 28*a* through the fiber optic tube 13.

The motor 1 can be started from either of the pushbutton stations 14 or 15. When the start switch 35 is depressed, for example, power is applied to optical transmitter 28 and it generates light to the optical receiver 21. The switch 22 in the optical receiver 21 closes in response to the received light signal and the optical transmitter 24 is energized. A light signal is thus generated to the pushbutton station 15 and returned to the optical receiver 11 to close the switch 12. The line contactor M1 is thus energized to start the motor 1 and to close its auxiliary contacts 5. The auxiliary contacts 5 in turn apply power to the optical transmitter 17 which generates a light signal to the optical receiver 27 in the pushbutton station 14. The contacts 34 in the optical receiver 27 close to maintain power to the optical transmitter 28 when the start pushbutton switch 35 is released. The control loop is thus maintained, or latched, in this energized state in which the motor 1 is operating and the indicator lights 36 at each pushbutton station 14 and 15 are illuminated.

If any one of the stop pushbutton switches 10, 33 or 33*a* is depressed, power to one of the elements in the control loop is removed and the control loop is de-energized. The line contactor M1 then "drops out" and the motor 1 is shut down and the indicator lights 38 at each pushbutton station 14 and 15 are illuminated. Similarly, if the malfunction occurs in one of the control loop elements signal continuity is broken and the motor 1 is shut down.

It should be apparent to those skilled in the art that the present invention is also applicable to motor controls which employ solid state switching devices in lieu of an electromagnetic line contactor. Such solid state switching devices are operated by the control loop, and when energized, they apply power to the motor and their control circuits close an auxiliary switch to latch the control loop in its energized state.

I claim:

1. In a motor control having a line contactor which operates a set of contacts to energize a motor when electric power is applied to the line contactor's coil, the combination comprising:

a first optical receiver connected to said contactor coil and having a set of electrical contacts which are operated when light is received to apply electric energy to said contactor coil;

a first optical transmitter for emitting light when electrical energy is applied;

circuit means including a second set of contacts which are operated by said line contactor to supply electrical energy from a source to said first optical transmitter when the motor is energized;

first light coupling means connected to said first optical transmitter for conducting light generated thereby;

second light coupling means connected to said first optical receiver for applying light thereto; and a remote pushbutton station which connects to said first and second light coupling means and which includes:

(a) a second optical receiver coupled to said first light coupling means and to a source of electrical energy, and having a switch which is operated to conduct electrical energy when light is received through the first light coupling means;

(b) a second optical transmitter connected in circuit with the switch in said second optical receiver and being operable to generate light in said second light coupling means when said electrical energy is supplied to it;

(c) first circuit means including first switch means connected in circuit with said second optical transmitter for supplying electrical energy from a source to the second optical transmitter when the first switch means is operated; and (d) second circuit means including second switch means connected in series circuit with the switch in said second optical receiver to supply electrical energy thereto from a source and to interrupt that supply of electrical energy to said switch in the second optical receiver and said second optical transmitter when the second switch means is operated.

2. In a motor control having a line contactor which operates a set of switches to energize a motor when electric power is applied to the line contactor and a control circuit for controlling the application of electric power to the line contactor and which comprises:

first circuit means which includes auxiliary switch means that are operated by the line contactor to supply power from a source to a first optical transmitter when the motor is energized;

first fiber optic coupling means connected to the first optical transmitter for coupling its optical output signal to a remote pushbutton station;

first optical receiver means coupled to the first fiber optic coupling means and connected in a first circuit at the remote pushbutton station, the first optical receiver means being operable when an optical signal is received to become a conductive element in the first circuit;

second optical transmitter means connected in the first circuit with said first optical receiver means for generating an optical signal when the first circuit is conductive;

second fiber optic coupling means connected to the second optical transmitter for coupling its optical output signal from the remote pushbutton station;

second optical receiver means coupled to the second fiber optic coupling means and connected in a second series circuit with said contactor to supply electric power from a source to the contactor when an optical signal is received; and switch means at said pushbutton station connected in said first circuit and being operable to make the first circuit conductive and to thereby drive the control circuit into an energized state which starts the motor, and also being operable to open said first circuit to thereby de-energize the control circuit and shut down the motor.

3. The motor control as recited in claim 2 in which a first indicator light and a second indicator light are connected in said first circuit at said remote pushbutton station and in which said first indicator light is illuminated when the control circuit is in its energized state and said second indicator light is illuminated when the control circuit is in its deenergized state.

* * * * *